US010630888B2

(12) United States Patent
Parameswaran et al.

(10) Patent No.: US 10,630,888 B2
(45) Date of Patent: Apr. 21, 2020

(54) METHOD AND APPARATUS FOR SELECTING CAPTURE CONFIGURATION BASED ON SCENE ANALYSIS

(71) Applicant: Samsung Electronics Co., Ltd., Suwon-si, Gyeonggi-do (KR)

(72) Inventors: Sankaranarayanan Parameswaran, Bangalore (IN); Sandeep Jana, Bangalore (IN); Ankit Dhiman, Bangalore (IN); Narasimba Gopalakrishna Pai, Bangalore (IN); Lokesh Rayasandra Boregowda, Bangalore (IN); Santle Camilus, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/879,019

(22) Filed: Jan. 24, 2018

(65) Prior Publication Data

US 2018/0227479 A1 Aug. 9, 2018

(30) Foreign Application Priority Data

Feb. 9, 2017 (IN) .............................. 201741004756

(51) Int. Cl.
*H04N 5/232* (2006.01)
*H04N 5/235* (2006.01)
*H04N 5/225* (2006.01)

(52) U.S. Cl.
CPC ....... *H04N 5/23216* (2013.01); *H04N 5/2258* (2013.01); *H04N 5/2353* (2013.01);
(Continued)

(58) Field of Classification Search
CPC ......... H04N 5/23216; H04N 5/232133; H04N 5/2258; H04N 5/23245; H04N 5/23258;
(Continued)

(56) References Cited

U.S. PATENT DOCUMENTS 7,403,707 B2 7/2008 Raskar et al.
7,822,327 B2 10/2010 Chien et al.
(Continued)

FOREIGN PATENT DOCUMENTS

CN 105959574 A 9/2016
EP 2 549 763 A2 1/2013
(Continued)

OTHER PUBLICATIONS

European Search Report dated Sep. 30, 2019; European Appln. No. 18750665.4-1208 PCT/KR2018001158.

*Primary Examiner* — Sinh Tran
*Assistant Examiner* — Zhenzhen Wu
(74) *Attorney, Agent, or Firm* — Jefferson IP Law, LLP

(57) ABSTRACT

A method of selecting capture configuration based on scene analysis and an image capturing device are provided. The method includes analyzing by a processor, a scene currently being captured by an image capturing device having a plurality of imaging sensors, identifying a current image capturing mode of the image capturing device, setting at least one capture parameter for the plurality of the imaging sensors, upon determining that the at least one capture parameter of the current image capturing mode has to be changed, and determining a timing sequence for triggering the plurality of imaging sensors to capture a plurality of image frames based on the set at least one capture parameter.

22 Claims, 20 Drawing Sheets

(52) U.S. Cl.
CPC ......... *H04N 5/2355* (2013.01); *H04N 5/2356* (2013.01); *H04N 5/23245* (2013.01); *H04N 5/23258* (2013.01); *H04N 5/23293* (2013.01); *H04N 5/232133* (2018.08)

(58) Field of Classification Search
CPC ............. H04N 5/23293; H04N 5/2353; H04N 5/2355; H04N 5/2356; H04N 13/00
USPC ...................................................... 348/222.1
See application file for complete search history.

(56) References Cited

U.S. PATENT DOCUMENTS

| | | |
|---|---|---|
| 8,189,100 B2 | 5/2012 | Li et al. |
| 8,208,048 B2 | 6/2012 | Lin et al. |
| 9,445,003 B1 | 9/2016 | Lelescu et al. |
| 9,560,269 B2 | 1/2017 | Baldwin |
| 2012/0105579 A1* | 5/2012 | Jeon ..................... H04N 5/2258 348/38 |
| 2012/0162366 A1 | 6/2012 | Ninan et al. |
| 2012/0281133 A1* | 11/2012 | Kurita ................ H04N 5/23254 348/362 |
| 2015/0092066 A1 | 4/2015 | Geiss et al. |
| 2016/0050374 A1* | 2/2016 | Shabtay ............... H04N 5/2258 348/240.3 |
| 2016/0323508 A1* | 11/2016 | Ayalasomayajula ......................... H04N 5/23245 |
| 2016/0337587 A1* | 11/2016 | Chou ................. H04N 5/23245 |
| 2017/0023492 A1 | 1/2017 | Olsson et al. |
| 2017/0041528 A1* | 2/2017 | Lai ..................... H04N 5/23254 |

FOREIGN PATENT DOCUMENTS

| | | |
|---|---|---|
| JP | 2013-059026 A | 3/2013 |
| WO | 2014-138697 A1 | 9/2014 |

\* cited by examiner

METHOD AND APPARATUS FOR SELECTING CAPTURE CONFIGURATION BASED ON SCENE ANALYSIS

CROSS-REFERENCE TO RELATED APPLICATION(S)

This application claims the benefit under 35 U.S.C. § 119(a) of an Indian patent application filed on Feb. 9, 2017 in the Indian Patent Office and assigned Serial number 201741004756, the entire disclosure of which is hereby incorporated by reference.

TECHNICAL FIELD

The present disclosure relates to image capturing devices. More particularly, the present disclosure relates to methods of selecting capture configuration based on scene analysis and image capturing devices using the methods.

BACKGROUND

In recent years, wireless electronic devices with built-in cameras have become increasingly popular. These wireless electronic devices include, but are not limited to, smartphones, digital cameras, and the like and allow users to capture images of their interest. A built-in camera generally includes a sensor, an image signal processor (ISP), and a memory.

A camera system may correspond to a mono camera based system or a multi-camera based system. The camera system may operate in useful camera modes, such as a low light mode and a high definition range (HDR) mode to capture images. In addition, different capture configurations are required for different modes, these capture configurations corresponding to exposure settings, focus settings, and international standards organization (ISO) settings. For example, in order to capture a HDR image using the mono camera based system, a mono camera has to be adjusted to different exposure levels, namely, an auto exposure (AE) level, a short exposure (SE) level, or a long exposure (LE) level. Hence, the mono camera has to capture three sets of images with these different exposure levels. The images that are captured at different exposures are then processed to finally render the HDR image. Similarly, for capturing an image in a low light mode using the mono camera, multiple images with different exposures or ISO settings need to be captured.

Thus, the mono camera based system has several limitations when live preview of images is provided in different modes. Some of these limitations are mentioned below.

Since the above camera modes require specific burst capture configurations, for example, the HDR mode requires use of a built-in sensor for exposure bracketed capture, live preview in such special camera modes is not possible in all devices.

In addition, in these modes, the output image always lags with respect to the previewed image. In other words, zero shutter lag (ZSL) is not possible in such devices for special camera modes.

Scene analysis to identify the mode of decision is limited to using the mono camera based systems and varying parameters thereof. Hence, preset or manual decision based capture configurations are used.

The above disadvantages are overcome by using a multi-camera based system including multiple sensor units. However, these multiple sensor units are configured with pre-defined exposure setting. As these settings are preset, a user cannot change the settings by analyzing a scene to be captured in order to select a better mode to capture good quality images.

Currently, there exists no solution to improve a preview experience in mono/multi camera systems based on scene analysis. Therefore, there is a need for a novel method to select a multi-camera capture configuration based on scene analysis.

The above-mentioned shortcomings, disadvantages, and problems are addressed herein and which will be better understood from the following specification.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide image capturing devices, and a method of selecting capture configuration based on scene analysis.

Another aspect of the present disclosure is to provide a method of selecting capture configuration in a multi-camera system based on scene analytics.

In accordance with an aspect of the present disclosure, a method of selecting a capture configuration based on scene analysis is provided. The method includes analyzing, by a processor, a scene currently being captured by an image capturing device having a plurality of imaging sensors, identifying a current image capturing mode of the image capturing device, determining whether at least one capture parameter of the current image capturing mode has to be changed, setting the at least one capture parameter for each of the imaging sensors upon determining that the at least one capture parameter of current image capturing mode has to be changed, determining a timing sequence for triggering the plurality of image sensors and capturing a plurality of image frames based on the set at least one capture parameter, and rendering a live preview of the plurality of image frames captured by the plurality of imaging sensors.

In accordance with another aspect of the present disclosure, a method of analyzing a scene currently being captured is provided. The method includes inputting, by the image capturing device to the processor, the plurality of image frames, gyroscope readings and inertial sensor readings, and performing at least one of a scene depth and occlusion analysis, local-global motion analysis or ambient-lighting analysis on the plurality of image frames to identify the current image capturing mode.

In accordance with another aspect of the present disclosure, a method of determining a timing sequence for triggering a plurality of image sensors to capture a plurality of image frames is provided. The method includes verifying if each of the plurality of imaging sensors is configured for zero shutter lag (ZSL), and capturing, by the plurality of imaging sensors, the plurality of image frames of the scene synchronously across the plurality of imaging sensors with ZSL effect, if each of the imaging sensors is configured for the ZSL.

In accordance with another aspect of the present disclosure, a method of rendering a live preview from a plurality of frames is provided. The method includes performing real-time processing on the plurality of image frames to provide a live preview output based on the set at least one capture parameter of the image capturing mode.

In accordance with another aspect of the present disclosure, a scene is provided. The scene includes at least one of a portrait, scenery, and one or more objects and the at least one capture parameter comprises exposure metering, focal length and international standards organization (ISO) speed.

In accordance with another aspect of the present disclosure, an image capturing mode is provided. The image capturing mode includes at least one of an auto capture mode, a high definition resolution (HDR) mode, a de-blur mode, an extended depth of field (DOF) mode and low light mode.

In accordance with another aspect of the present disclosure, in the capturing of the scene in extended DOF mode, a method is provided. The method includes receiving, by the processor from a depth and occlusion analysis device, depth and occlusion information associated with the scene being captured, performing, by the processor, a dynamic differential focal adjustment for each of the plurality of imaging sensors based on the scene analysis for providing live preview of an DOF of the scene, and capturing the scene, by the plurality of imaging sensors, after the performing of the dynamic differential focal adjustment.

In accordance with another aspect of the present disclosure, in the capturing of the scene in HDR mode, a method is provided. The method includes performing a differential exposure adjustment for each of the plurality of imaging sensors based on the scene analysis for providing live preview of an HDR image of the scene, and capturing the scene, by the plurality of imaging sensors, after the performing of the dynamic differential exposure adjustment.

In accordance with another aspect of the present disclosure, a method is provided. The method further includes capturing, by the image capturing device, the scene according to the set at least one capture parameter.

In accordance with another aspect of the present disclosure, an image capturing device capable of selecting camera capture configurations based on scene analysis is provided. The image capturing device includes a plurality of imaging sensors, and an processor configured to analyze a scene currently being captured by an image capturing device, identify a current image capturing mode of the image capturing device, determine whether at least one capture parameter of current image capturing mode has to be changed, set the at least one capture parameter for each of the imaging sensors upon determining that the at least one capture parameter of current image capturing mode has to be changed, determine a timing sequence for triggering the plurality of image sensors for capturing a plurality of image frames based on the set at least one capture parameter, and render a live preview of the plurality of image frames captured by the plurality of imaging sensors.

Various aspects of the disclosure have been presented above to serve as an aid to better understand the detailed description below. There is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantage of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
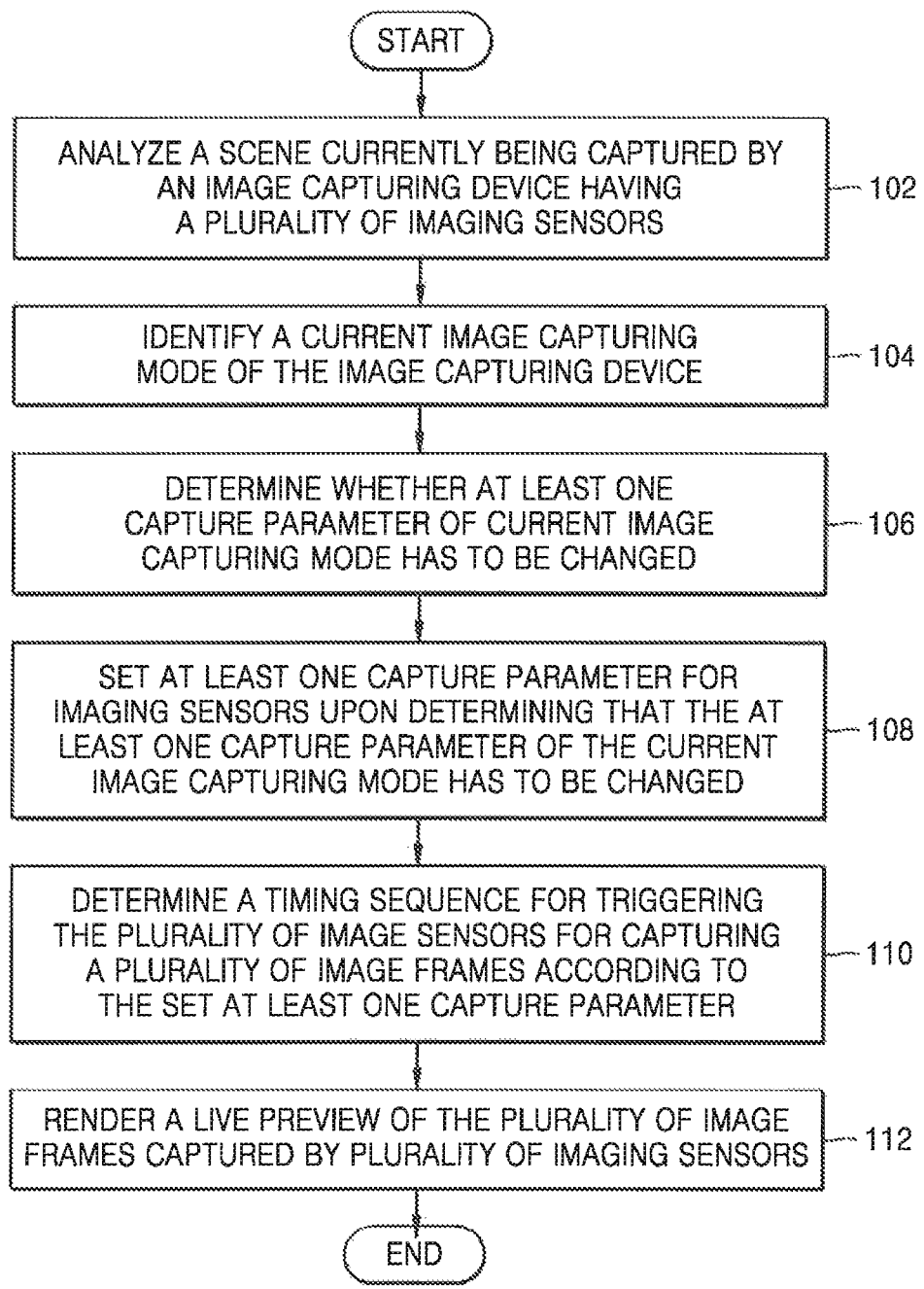
FIG. 1 is a flowchart illustrating a method of selecting capture parameters of a scene based on scene analysis according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The various embodiments of the present disclosure disclose a method of selecting a capture configuration based on scene analysis. In the following detailed description of the various embodiments of the disclosure, reference is made to the accompanying drawings which shown by way of illustration specific embodiments in which the disclosure may be practiced. These various embodiments are described in sufficient detail to enable those skilled in the art to practice the disclosure, and it is to be understood that other various embodiments may be utilized and that changes may be made without departing from the scope of the present disclosure. The following detailed description is, therefore, not to be taken in a limiting sense, and the scope of the present disclosure is defined only by the appended claims.

The specification may refer to "an," "one" or "some" various embodiment(s) in several locations. This does not necessarily imply that each reference is to the same embodiment(s) or that the feature only applies to a single embodiment. Single features of different various embodiments may also be combined to provide other various embodiments.

As used herein, the singular forms "a," "an" and "the" are intended to include the plural forms as well, unless expressly stated otherwise. It will be further understood that the terms "includes," "comprises," "including" and/or "comprising" when used in this specification, specify the presence of stated features, integers, operations, elements and/or components, but do not preclude the presence or addition of one or more other features, integers, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure provide a method of selecting camera capture configurations based on scene analysis. Although various embodiments are described in the present disclosure, they do not limit to the scope of the present disclosure.

The various embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the various embodiments herein. The examples used herein are intended merely to facilitate an understanding of ways in which the various embodiments herein can be practiced and to further enable those of skill in the art to practice the various embodiments. Accordingly, the various embodiments should not be construed as limiting the scope of the present disclosure.

FIG. 1 is a flowchart illustrating a method of selecting capture parameters of a scene based on scene analysis according to an embodiment of the present disclosure.

Referring to FIG. 1, the scene comprises at least one of a portrait, scenery, and one or more objects. The scene is captured using an image capturing device. The image capturing device may include at least one of an array camera, a stereo camera, or a multi camera system having a plurality of image sensors. The image capturing device may further include a processor for analyzing the scene and selecting capture parameters according to the analyzed scene. In an embodiment of the present disclosure, it is considered that the scene is being captured by the image capturing device having a plurality of imaging sensors. Each of the plurality of imaging sensors may operate according to capture parameters, such as exposure, international standards organization (ISO), and focus. Other capture parameters used by the imaging sensors may include, but are not limited to, saturation, white balance, zoom, contrast, brightness, gain, sharpness, resolution, image quality, scene selection, and metering mode. These capture parameters may vary based on one or more capturing modes of the image capturing device. The one or more capturing modes of the image capturing device may include, but are not limited to, a high dynamic range (HDR) mode, a low light mode, a de-blur mode, and an extended depth of field (DOF) mode. A procedure for selecting capture parameters based on scene analysis is explained in detail below.

In operation 102, a scene currently being captured by the image capturing device having the plurality of imaging sensors is analyzed by a processor.

In operation 104, a current image capturing mode of the image capturing device is identified by the processor. In an embodiment of the present disclosure, the processor receives a plurality of preview frames, gyroscope readings, and inertial sensor readings and then performs a scene depth and occlusion analysis, local-global motion analysis, and ambient-lighting analysis of the scene to identify the current image capturing mode.

In operation 106, after the current image capturing mode is identified, it is whether at least one capture parameter of the current image capturing mode has to be changed.

If it is determined that at least one capture parameter has to be changed, then, in operation 108, the determined at least one capture parameter is set for each of the imaging sensors in such a way that a quality of scene to be captured is higher.

Therefore, in operation 110, a timing sequence for triggering the plurality of imaging sensors to capture a plurality of image frames according to the set at least one capture parameter is determined. The operation 110 is combined with real-time processing of the plurality of images so that a previewed output has less latency and the scene exhibits zero shutter lag (ZSL).

After synchronously capturing series of image frames across all of the imaging sensors, in operation 112, a live preview of the plurality of image frames is rendered on a display of the image capturing device.

Figure 2:
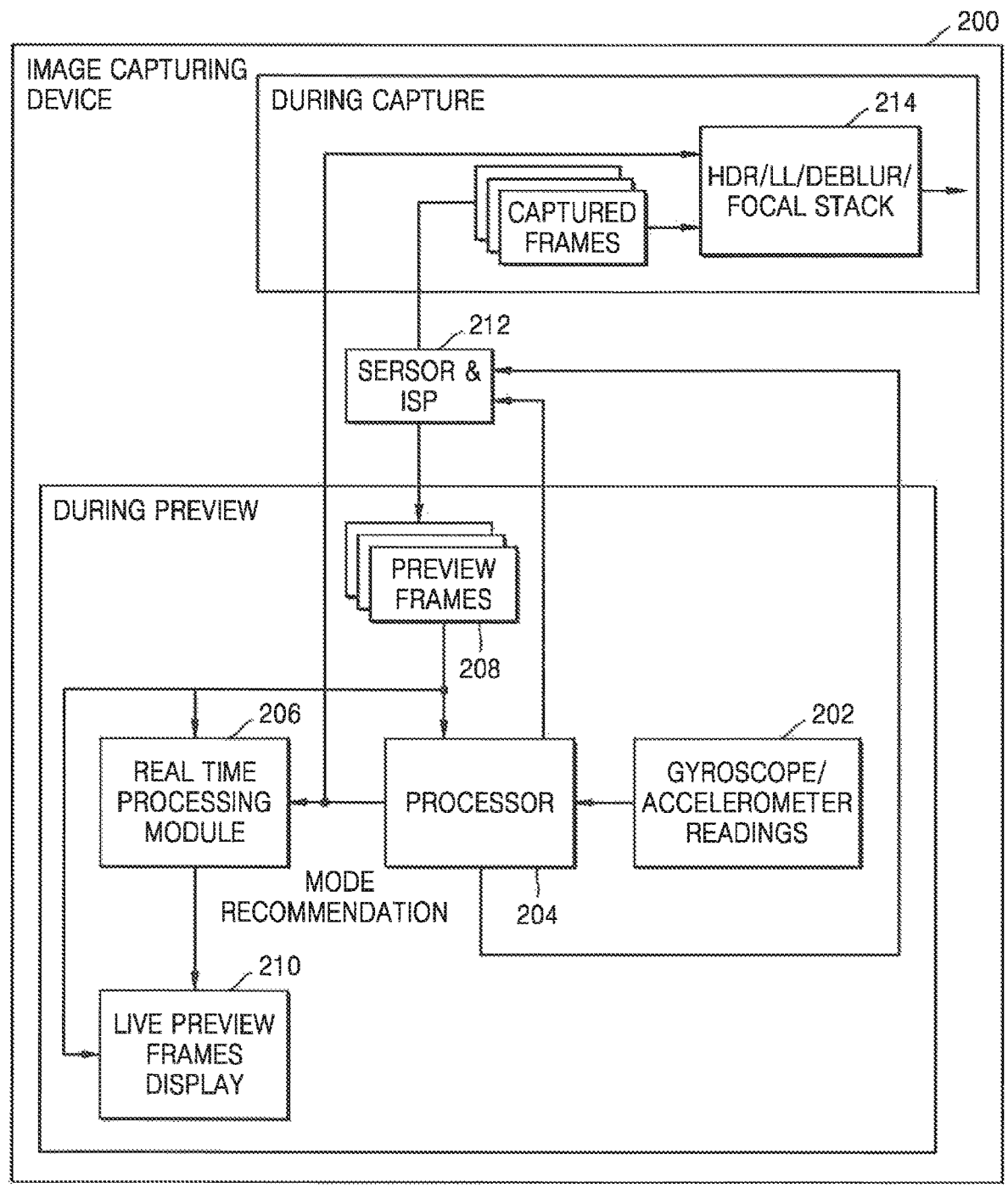
FIG. 2 is a block diagram illustrating an image capturing device capable of selecting capture parameters of a scene according to an embodiment of the present disclosure.

FIG. 2 is a block diagram illustrating an image capturing device capable of selecting capture parameters of a scene according to an embodiment of the present disclosure.

FIG. 2 illustrates functioning of an image capturing device 200 during a preview mode and a capture mode. The image capturing device 200 may correspond to any type of a multi-camera system, such as a stereo camera system or an array camera system.

Referring to FIG. 2, it is assumed that the image capturing device 200 is a multi-camera system, but the present disclosure is not limited thereto. The image capturing device 200 may include a processor 204, an inertial sensor unit, a real-time processing module 206, a preview frames display unit 210, a sensor and image signal processor (ISP) unit 212, inertial measuring units (IMU), and a plurality of imaging sensors. Needless to say, the processor 204, the real-time processing module 206, the sensor and ISP unit 212, and IMU can be implemented as at least one hardware processor. When the image capturing device 200 is operating in the preview mode, the processor 204 receives inertial readings from the inertial sensor unit, such as a gyrometer/accelerometer 202 and one or more preview frames 208 of the scene from the sensor and ISP unit 212. The scene being previewed may comprise of a portrait, scenery, and one or more objects. The sensor readings obtained from the gyrometer/accelerometer 202 provide information about stability of the image capturing device 200. For example, the sensor readings provide information as to whether a user of the image capturing device 200 is holding the device firmly or shakily. This information is provided by the IMU to the processor 204.

Based on received inputs, the processor 204 identifies a current image capturing mode of the scene and determines whether any capture parameters have to be changed. If it is determined that the current image capture parameter have to be changed, the processor 204 sets the capture parameter for each of the plurality of imaging sensors based on the determination. The processor 204 further determines a timing sequence to trigger the plurality of imaging sensors to capture a plurality of image frames based on the set capture parameter. Then, the one or more preview frames 208 captured based on the set capture parameter are processed in real time by the real-time processing module 206 and a live preview of one or more processed preview frames is rendered on the live preview frames display unit 210. On the other hand, if it is no need to change the capture parameter, the one or more preview frames are rendered live.

The initial operations performed in the preview mode are repeated in the capture mode to make sure that the image capturing device 200 is stable and the one or more preview frames 208 are captured according to the set capture parameter. When the image capturing device 200 operates in the capture mode, the processor 204 receives the one or more preview frames 208 from the sensor and ISP unit 212 and identifies a current image capturing mode of the scene. The processor 204 recommends a mode suitable for the scene to be captured based on the received one or more preview frames 208. Then, the sensor and ISP unit 212 captures the one or more preview frames of the scene and the captured frames are then stored in a memory of the image capturing device 200.

Figure 3A:
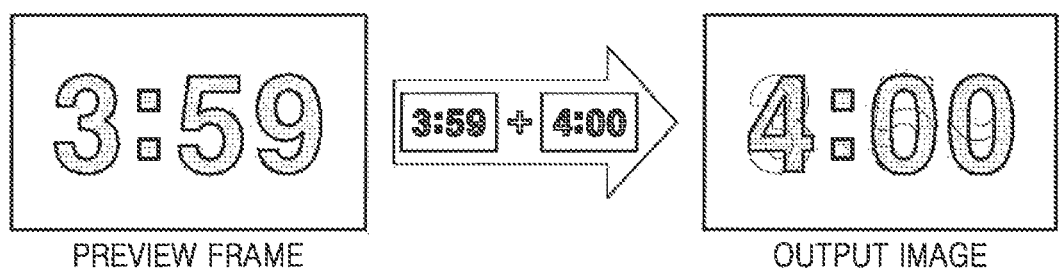
FIGS. 3A and 3B are schematic diagrams illustrating a demonstration of zero shutter lag (ZSL) according to an embodiment of the present disclosure.
Figure 3B:
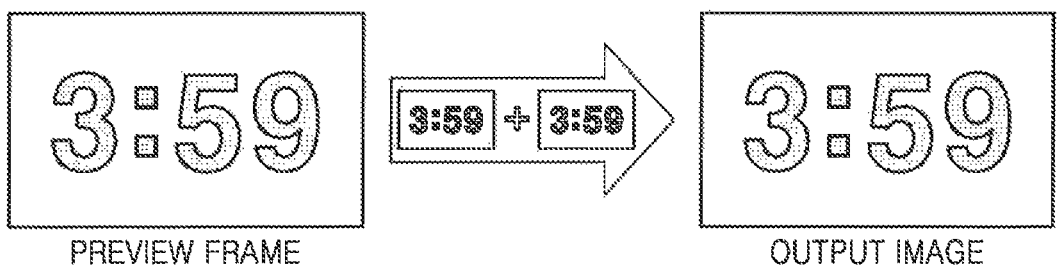

FIGS. 3A and 3B are schematic diagrams respectively illustrating a demonstration of a ZSL effect according to the related art and according to an embodiment of the present disclosure. In the related art, ZSL in the case of algorithms with multiple frames as input is not possible as all the frames are to be captured by the same sensor of a mono camera system. Hence, there is always a delay between the previewed image and the captured image.

Referring to FIG. 3A, it is considered that a user is previewing an image using a mono camera at a time period of, for example, 3.59. When the user captures the image, an image sensor in the mono camera is able to capture the image at a time period of, for example, 4.00. Thus, a delay is inevitable and ZSL is not possible in mono cameras.

Referring to FIG. 3B, however, in the present disclosure, since the image capturing device 200, such as the multi-camera system, that is, a stereo camera or array camera, is used, it is possible to simultaneously capture a plurality of image frames by using the plurality of imaging sensors. Hence, if a user previews an image at a time period of, for example, 3.59, and captures the image, the image capturing device 200 displays the image shot at 3.59. Thus, ZSL is achieved in the present disclosure.

Figure 4:
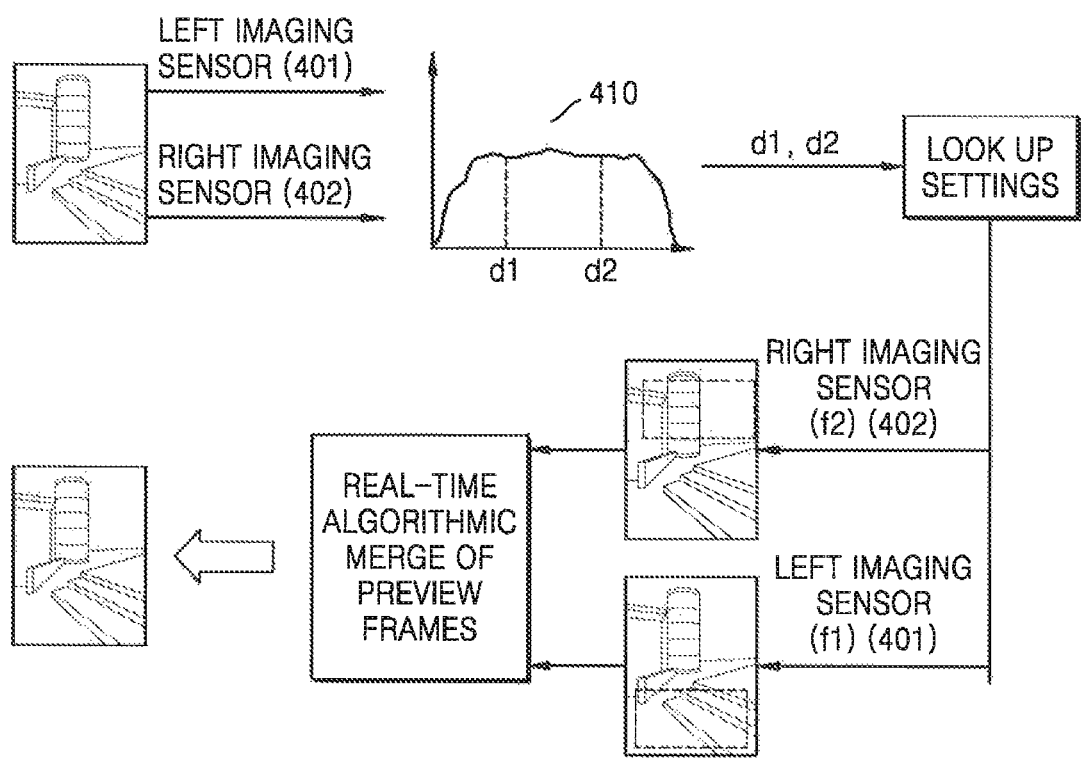
FIG. 4 is a schematic diagram illustrating an operation of an image capturing device to capture or preview a scene in an extended depth of field (DOF) mode according to an embodiment of the present disclosure.

FIG. 4 is a schematic diagram illustrating an operation of an image capturing device to capture or preview a scene in an extended DOF mode according to an embodiment of the present disclosure.

Referring to FIG. 4, it is considered that a scene is previewed through the image capturing device 200 having the plurality of imaging sensors and a capture mode is in an extended DOF mode. According to an embodiment of the present disclosure, the plurality of imaging sensors include a left imaging sensor 401 and a right imaging sensor 402. When the scene is previewed through the right and left imaging sensors a depth map 410 is generated and analyzed for identifying right focal depths for both of the right and left imaging sensors. Based on the depth map analysis, a focal length for each of the right and left imaging sensors (d1, d2) is determined. Then, each of the right and left imaging sensors is configured with the determined focal length for providing the preview frames. Later, a computational photography algorithm is used by the image capturing device to run the preview frames obtained from both of the right and left imaging sensors. The preview frames are then merged to provide a final preview of the scene in the extended DOF mode. The whole process is shown in FIG. 4. According to an embodiment of the present disclosure, a user may capture the scene in the extended DOF mode using the same preview frames for achieving ZSL.

Figure 5A:
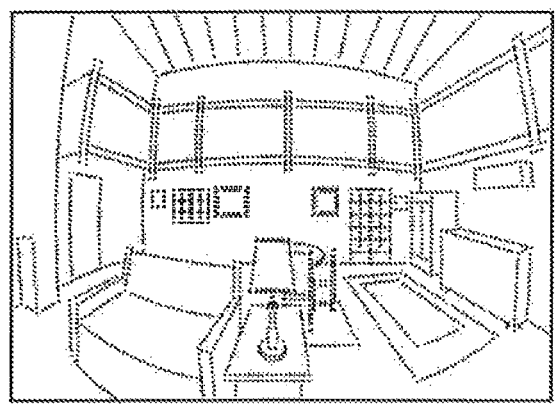
FIGS. 5A and 5B are schematic diagrams respectively illustrating an operation of an image capturing device of the related art and the image capturing device of the present disclosure to capture or preview a scene in a low light mode according to an embodiment of the present disclosure.
Figure 5B:
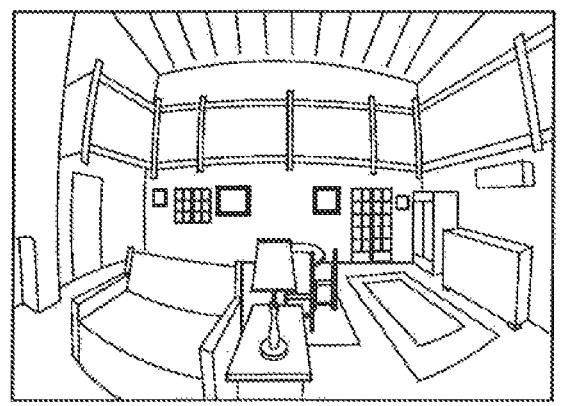

FIGS. 5A and 5B are schematic diagrams respectively illustrating an operation of an image capturing device according to the related art and an image capturing device to capture or preview a scene in a low light mode according to an embodiment of the present disclosure.

Referring to FIG. 5A, an example scene being previewed in a low light mode is illustrated according to the related art. In the related art, when the low light mode is selected by a user, the quality of the preview will not be enhanced as settings are fixed during the manufacture of the image capturing device. Therefore, the user has to accept the quality of the scene being previewed.

Referring to FIG. 5B, however, in the present disclosure, the processor 204 in the image capturing device 200 identifies a current image capturing mode as a low light mode and determines that differential exposure metering is required. The processor 204 further changes exposure metering adaptively to match the low light mode and the scene being previewed in the low light mode is illustrated in FIG. 5B.

Figure 6A:
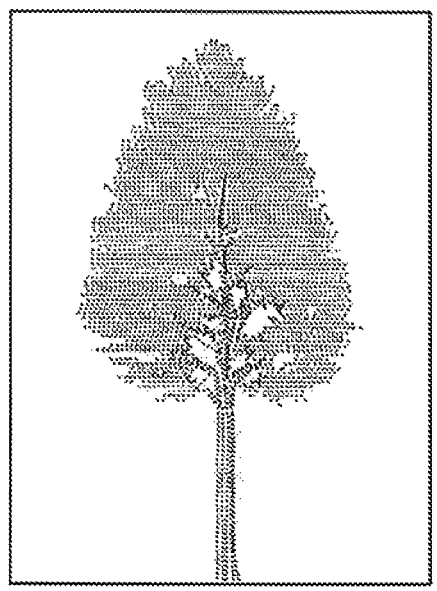
FIGS. 6A, 6B, and 6C are schematic diagrams respectively illustrating previewing of a scene when an image capturing device of the related art and the image capturing device of the present disclosure operate in a high dynamic range (HDR) mode according to an embodiment of the present disclosure.
Figure 6B:
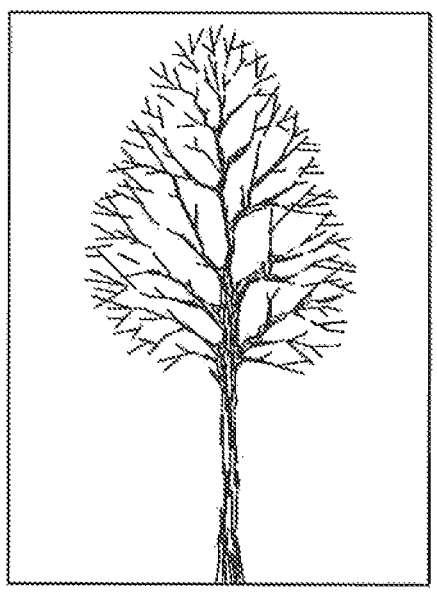

FIGS. 6A and 6B are schematic diagrams respectively illustrating an operation of previewing a scene when an image capturing device of the related art and an image capturing device of the present disclosure operate in an HDR mode according to an embodiment of the present disclosure. In the related art, a user cannot preview a HDR scene as HDR preview requires use of a built-in sensor for exposure bracketed capture.

Referring to FIG. 6A, a preview of a scene viewed in the HDR mode according to the related art. The previewed image as shown in FIG. 6A looks blurred and does not provide a user with a real HDR effect. However, in the present disclosure, the HDR preview is achieved using the processor 204 in the image capturing device 200. In the embodiment of the present disclosure, it is considered that the image capturing device 200 has a plurality of imaging sensors, for example, a right imaging sensor and a left imaging sensor, for capturing a plurality of image frames.

Referring to FIG. 6B, when the user selects the HDR mode, the analysis and the processor 204 first analyzes current scene being previewed and extracts capture parameters of the current scene. The processor 204 then determines that a capture parameter "exposure" has to be varied to preview the current scene in the HDR mode. The processor 204 then determines a value of the exposure and determines a timing sequence for triggering the right and left imaging sensors for capturing a plurality of frames of the current scene. Further, the image capturing device 200 used a HDR capture mode algorithm to merge the plurality of preview frames and a live preview of plurality of frames is rendered to the user.

Figure 6C:
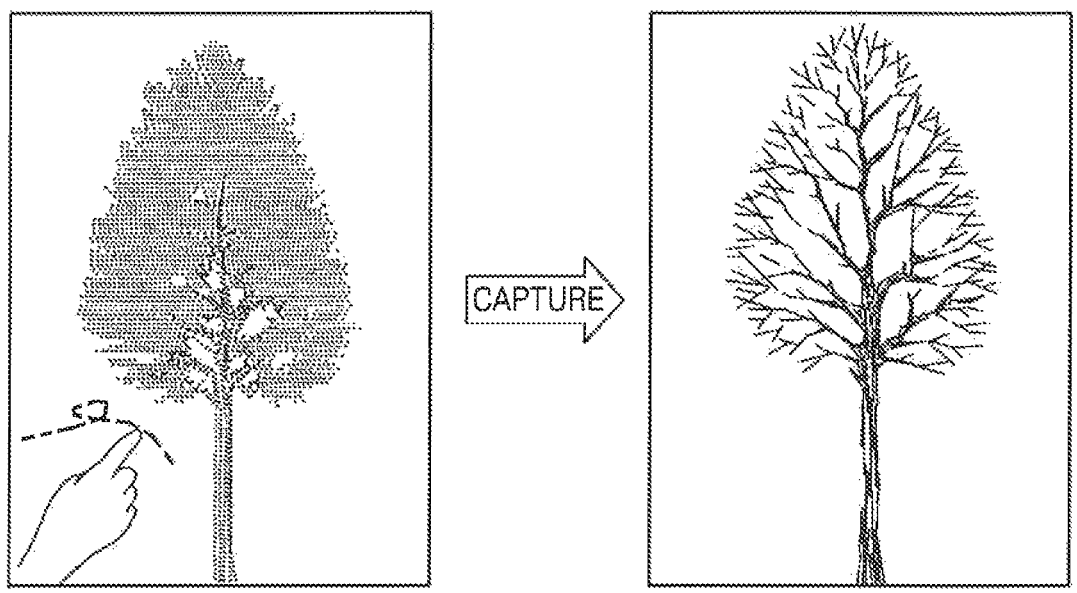

FIG. 6C is a schematic diagram illustrating a method of providing a dynamic preview of a scene when an image capturing device operates in an HDR mode according to an embodiment of the present disclosure.

Referring to FIG. 6C, a 2D control of the image capturing device 200 is illustrated, wherein a horizontal axis refers to control of a strength of the HDR algorithm, and a vertical axis refers to control of a capture attribute, e.g., the exposure value (EV). The user can visualize in real-time the effect of changing either or both parameters due to the ZSL effect.

Figure 7:
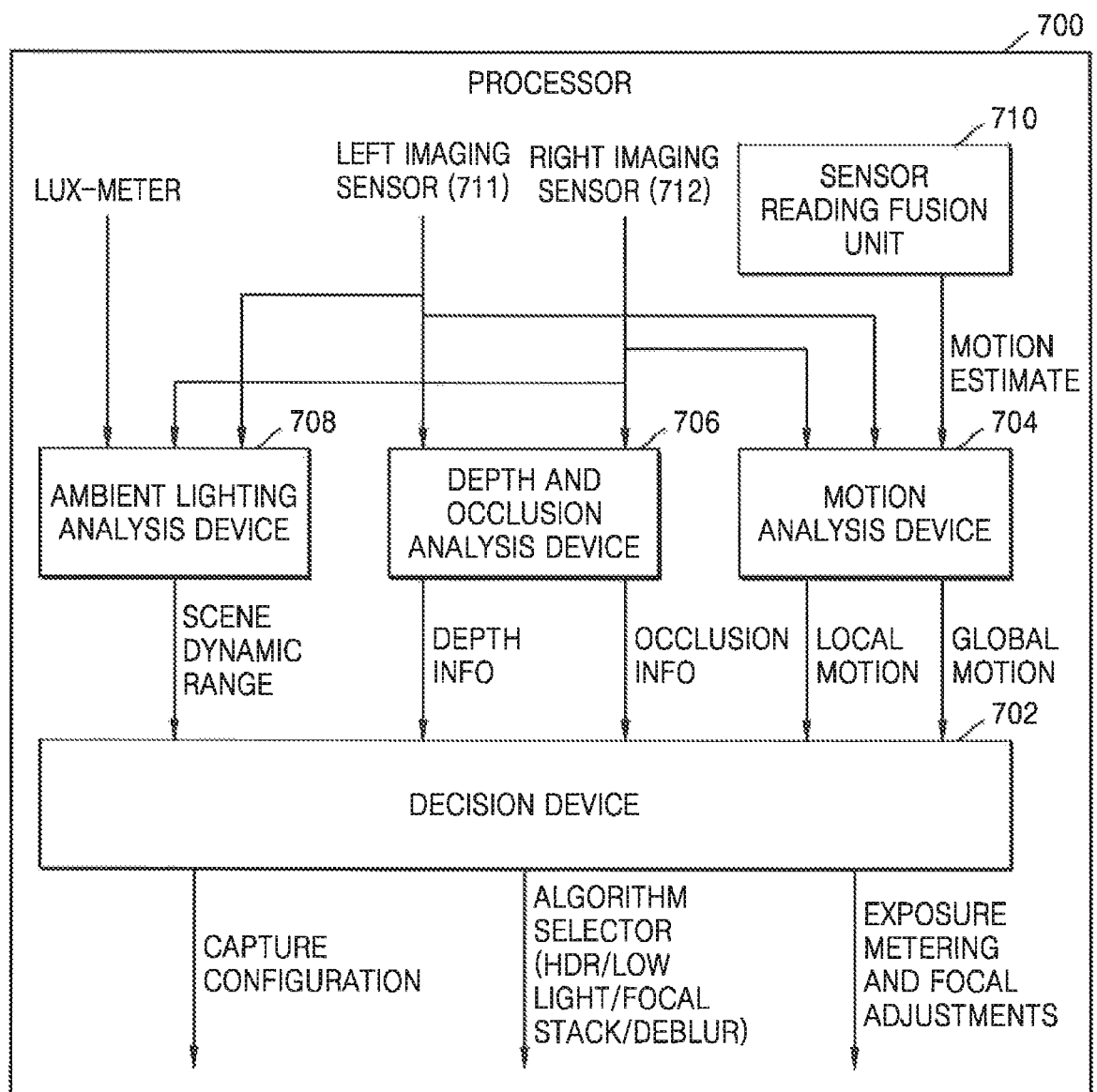
FIG. 7 is a block diagram illustrating various components of a processor according to an embodiment of the present disclosure.

FIG. 7 is a block diagram illustrating various components of a processor according to an embodiment of the present disclosure.

Referring to FIG. 7, a processor 700 includes a decision device 702, a motion analysis device 704, a depth and occlusion analysis device 706, an ambient lighting analysis device 708, a sensor readings fusion unit 710, and a display. The decision device 702, the motion analysis device 704, the depth and occlusion analysis device 706, the ambient lighting analysis device 708, the sensor readings fusion unit 710 can be implemented as at least one hardware processor. The display is not shown in FIG. 7 for the sake of brevity.

The motion analysis device 704 is configured to check stability of the processor 700. In an embodiment of the present disclosure, the motion analysis device 704 receives input from the sensor readings fusion unit 710 which provides inertial sensor readings obtained from different sensors, such as a gyroscope, an accelerometer, a magnetometer, and the like. Based on the received inertial sensor readings, the motion analysis device 704 determines a local and global motion of the image capturing device. The local motion provides information about an object moving locally in the scene and the global motion provides information a motion of the image capturing device, for example, pan, tilt, shake, zoom, rotation, and the like. The obtained local global motion information is provided to the decision device 702 for further analysis.

The depth and occlusion analysis device 706 is configured to receive preview frames from a right imaging sensor 712 and a left imaging sensor 711 and analyze depth and occlusion information from preview frames associated with a scene. The depth and occlusion analysis device 706 provides the information to the decision device 702. For example, according to an embodiment of the present disclosure, it is considered that a scene has high variation of a depth, and in this case, the depth and occlusion analysis device 706 indicates the presence of multiple objects at variable depths. In such a case, according to an embodiment of the present disclosure, it may be desired to have a large DOF images to cover the objects with sharp focus. The ambient-lighting analysis device 708 is configured to provide information on brightness of the scene to the decision device 702. In an embodiment of the present disclosure, the ambient-lighting analysis device 708 receives information on brightness of the scene from a lux meter. The ambient-lighting analysis device 708 analyzes the average lighting of the device and also the dynamic range of the scene. It may be appreciated by those skilled in the art that while a scene having HDR requires a HDR computational photography algorithm, a scene with normal dynamic range but low ambient lighting will require a noise suppression algorithm (or a low light photography algorithm).

The decision device 702 is configured to select capture parameters based on scene analysis. First, the decision device 702 analyzes the scene by receiving inputs from at least one of the motion analysis device 704, the depth and occlusion analysis device 706, and the ambient lighting analysis device 708. Using the received inputs, the decision device 702 identifies a current image capturing mode of the scene.

The decision device 702 further determines whether at least one capture parameter has to be changed. The at least capture parameter corresponds to at least one of exposure metering, focal length, and ISO speed. If it is determined that the at least one capture parameter has to be changed, then the processor 700 sets the at least one capture parameter for each of the imaging sensors. Then, a timing sequence for triggering each of the imaging sensors is determined so as to enable a user to see a preview image according to the mode identified by the decision device 702. In an embodiment of the present disclosure, the decision device 702 also enables the user to capture image frames like the image frames being previewed, thereby achieving a ZSL. To this end, the decision device 702 receives inputs from the motion analysis device 704, the depth and occlusion analysis device 706, the ambient lighting analysis device 708, and the sensor readings fusion unit 710 to decide a capture configuration and an algorithm mode.

Figure 8A:
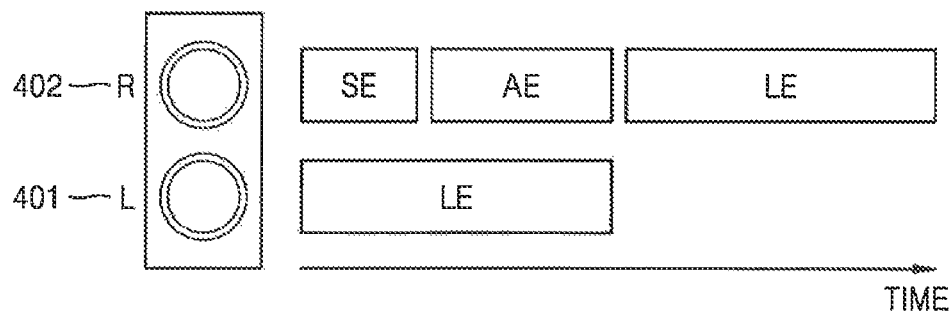
FIGS. 8A, 8B, and 8C illustrate capture configurations for selecting capture parameters based on scene analysis according to an embodiment of the present disclosure.
Figure 8B:
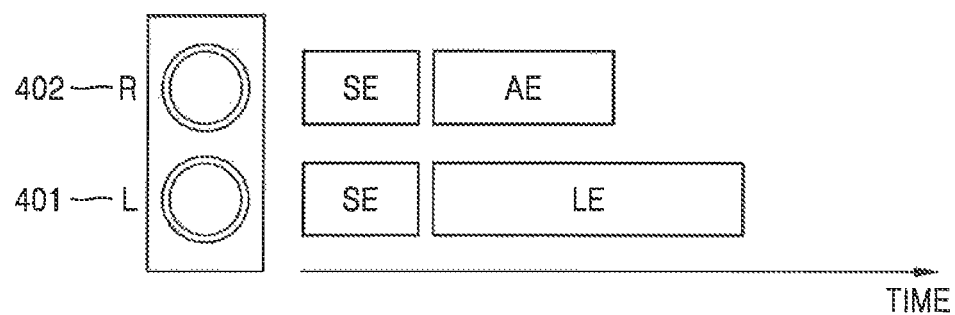
Figure 8C:
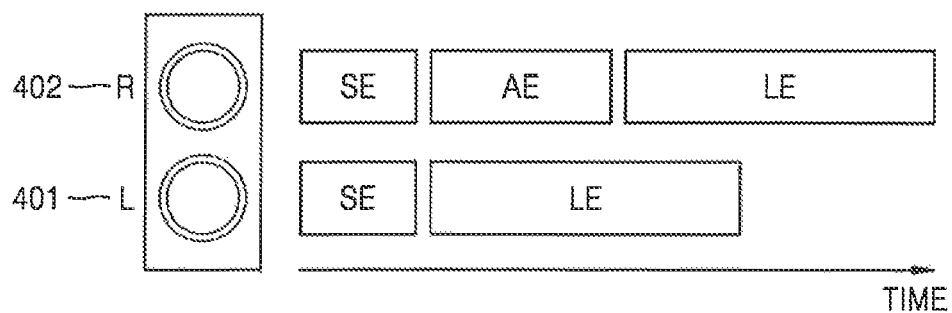

FIGS. 8A, 8B, and 8C illustrate capture configurations for selecting capture parameters based on scene analysis according to an embodiment of the present disclosure. The example configurations may help a user to capture fine quality images as the capture parameters are selected based on the scene analysis.

FIG. 8A illustrates a capture setting applied to a stereo camera having at least two imaging sensors according to an embodiment of the present disclosure.

Referring to FIG. 8A, the stereo camera is an example of the image capturing device 200 of the present disclosure. The at least two imaging sensors include a right imaging sensor 402 and a left imaging sensor 401. At first, the processor 204 identifies a current mode of a scene to be captured by using an offline computational photography algorithm. If it is determined that the identified mode is either complicated or power consuming, then the configuration as illustrated in FIG. 8A is used.

Referring to FIG. 8A, the right imaging sensor 402 captures the scene with three different exposure variations, namely, a short exposure (SE) image, an auto exposure (AE) image, and a long exposure (LE) image, whereas the left imaging sensor 401 captures the scene with LE setting. This capture configuration facilitates after-shot selection of LE depending on an offline algorithm decision.

The example configuration as shown in FIG. 8B is selected by the processor 204 when the scene requires better registration from an SE pair.

Referring to FIG. 8B, both the right and left imaging sensors capture the scene with SE image setting. The right imaging sensor 402 further captures the scene with AE setting and the left imaging sensor 401 further captures the scene with LE setting to achieve the desired output. This mode is recommended when the scene has dominant nearby objects that require accurate registration.

Referring to FIG. 8C, in some cases, the right imaging sensor may also capture the scene with LE to get better registration of the scene. This configuration mode is recommended when the scene is bright enough and requires SE times. According to an embodiment of the present disclosure, the capture configurations and selection methodology may be easily extendable to an image capturing device including multiple sensors.

FIGS. 9A, 9B, 9C, and 9D are schematic diagrams illustrating capture configurations selected by a multi-camera system for capturing a scene with depth variations according to embodiments of the present disclosure. The multi-camera system is an example of the image capturing device 200 of the present disclosure. As explained in the earlier sections, the multi-camera system includes at least two or more sensors for capturing a given scene and the processor 204 for selecting capture configuration for the given scene. The at least two or more sensors respectively correspond to a right imaging sensor 402 and a left imaging sensor 401.

Figure 9A:
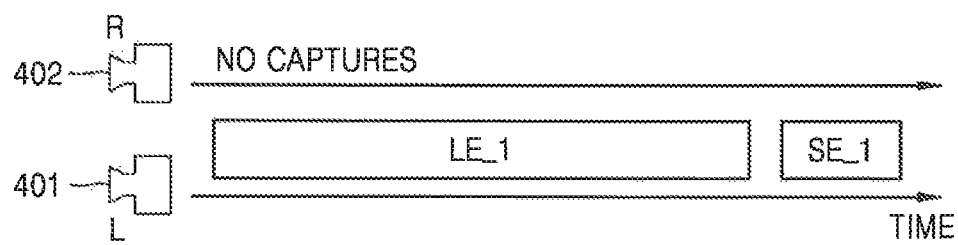
FIGS. 9A, 9B, 9C, and 9D are schematic diagrams illustrating capture configurations selected by a multi-camera system for capturing a scene with depth variations according to an embodiment of the present disclosure.

Referring to FIG. 9A, a capture configuration selected by the processor 204 in the multi-camera system is illustrated. In an embodiment of the present disclosure, when a user previews a scene to be captured, the processor 204 identifies that a current image capturing mode of the scene is a static mode, and thus, the scene ambient is moderately bright and has low depth variation. Based on the scene analysis, the processor 204 determines a timing sequence for triggering the at least two or more sensors in the multi-camera system. As the static scene is moderately bright and has low depth variation, the timing sequence is not triggered for one of the at least two or more sensors corresponding to the right imaging sensor 402 and is only triggered for one of the at least two or more sensors corresponding to the left imaging sensor 401. In the current embodiment of the present disclosure, the one of the at least two or more sensors corresponding to the left imaging sensor 401 is triggered to capture the scene with LE setting and SE setting for minimizing depth variations. Thus, this capture configuration helps a user to avoid artifact that might result due to large depth variations in the scene.

Figure 9B:
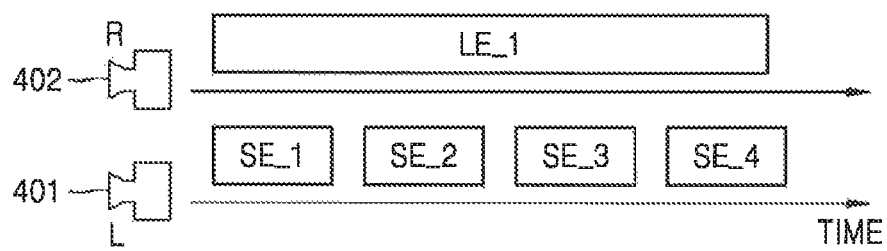
Figure 9C:
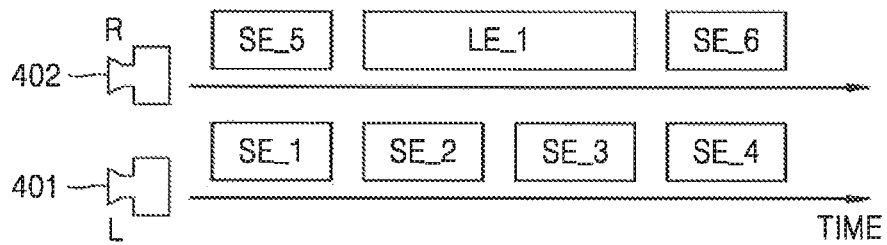

Referring to FIGS. 9B and 9C, a capture configuration selected by the processor 204 when a scene to be captured is static and has less depth variations is illustrated. Referring to FIG. 9B, the one of the at least two or more sensors corresponding to the left imaging sensor is triggered to capture various SE images at different timings to improve a signal to noise ratio (SNR), whereas the one of the at least two or more sensors corresponding to the right imaging sensor 402 is triggered to capture a single LE image to contribute color information of the scene. However, if the scene has large depth variations, the processor 204 selects the capture configuration of FIG. 9B and further triggers the one of the at least two or more sensors corresponding to the right imaging sensor 402 to capture SE images at a timing sequence of 5 and 6 for easy registration of images. The same is illustrated in FIG. 9C.

Figure 9D:
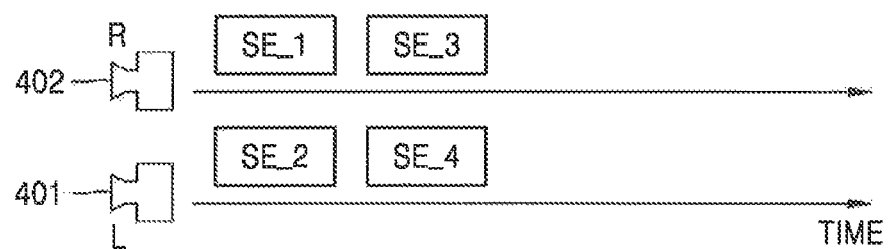

Referring to FIG. 9D, a capture configuration selected by the processor 204 when the scene has moderate lighting, less depth variation, and contains high motion objects is illustrated. Since, the scene contains highly moving objects, the processor 204 triggers the at least two or more sensors corresponding to left and right imaging sensors to capture SE images at four different timings. The SE images help in capturing moving objects with less capture time.

Figure 10A:
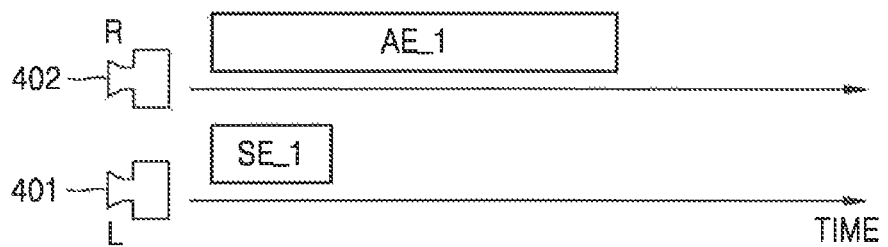
FIGS. 10A, 10B, and 10C illustrate capture configurations selected by a processor in a multi-camera system for capturing a scene with different lighting variations according to an embodiment of the present disclosure.
Figure 10B:
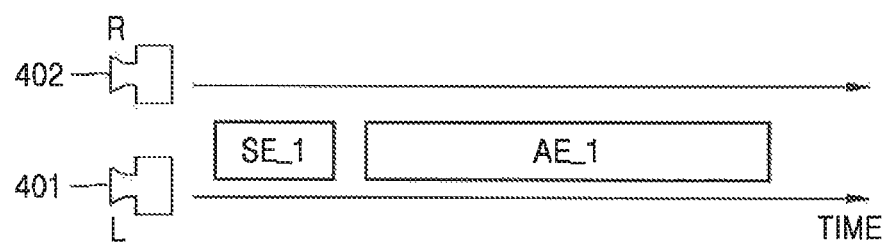
Figure 10C:
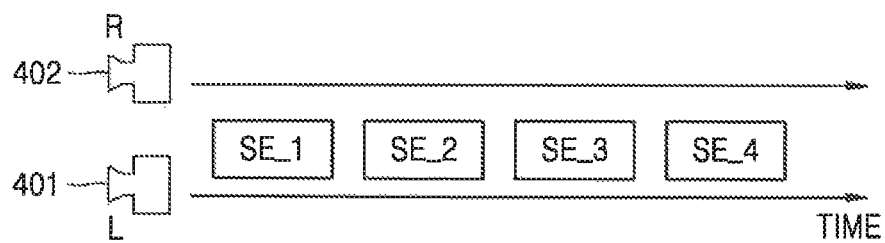

FIGS. 10A, 10B, and 10C illustrate capture configurations selected by a processor in a multi-camera system for capturing a scene with different lighting variations according to an embodiment of the present disclosure.

Referring to FIG. 10A, a capture configuration when the scene has good lighting conditions and contains high moving objects is illustrated. In order to capture the scene with high moving objects, the processor 204 determines a timing sequence for respectively triggering right and left imaging sensors. As such, the right imaging sensor 402 is triggered to capture the scene with AE setting and the left imaging sensor 401 is triggered to capture the scene with SE setting. This configuration is useful to capture the scene in a de-blur mode and with ZSL.

Referring to FIG. 10B, a capture configuration when a scene to be captured has complex depth variations is illustrated. The processor 204 triggers only the left imaging sensor 401 to capture the scene with SE and AE setting. The scene captured using the above configuration does not need stereo registration and may be processed in a shorter processing time.

Referring to FIG. 10C, a capture configuration selected by the processor 204 when a scene to be captured is in extreme low light conditions is illustrated. At first, the processor 204 determines that the scene is to be captured in the low light mode with a maximum exposure time. Similar to FIG. 10B, the processor 204 triggers only the left imaging sensor 401 for capturing the scene with multiple SE images with different timings. Further, this capture configuration does not require any stereo registration and hence it is useful for processing the captured images in a shorter processing time. The capture configuration also produces less registration artifacts.

Table 1 shown below illustrates outputs of the processor 204 operating under different conditions based on inputs thereto. In an embodiment of the present disclosure, the present disclosure can be implemented as a lookup, decision tree, or any suitable machine learning algorithm. It may be noted that some of the capture configurations may not be realizable in a preview and may not achieve ZSL. The processor 204 may be trained in such cases to bias towards the modes having ZSL by utilizing non ZSL modes only in the case of difficult scenes.

TABLE 1

Summary of Different Modes

| Input Condition | Mode | Configuration |
|---|---|---|
| High range, difficult scene. | HDR | FIG. 8A |
| High range, nearby dominant objects | HDR | FIG. 8B |
| High range, bright lighting | HDR | FIG. 8C |
| Low-moderate lighting, large depth variation | Low Light | FIG. 9A |
| Low lighting, moderate-small depth variation | Low light | FIG. 9B |
| Low lighting, moderate depth variation, nearby objects | Low light | FIG. 9C |
| Low lighting, high motion | Low light | FIG. 9D |
| Low lighting, large depth variation, some motion | Low light | FIG. 10C |
| Ambient lighting, low depth variation, faster motion (local) | De-blur | FIG. 10A |
| Ambient lighting, larger depth variation, slow/fast local motion | De-blur | FIG. 10B |
| Normal lighting, dynamic range, large variations in depth (near to far) | Focal Stack | FIG. 4 |

Figure 11A:
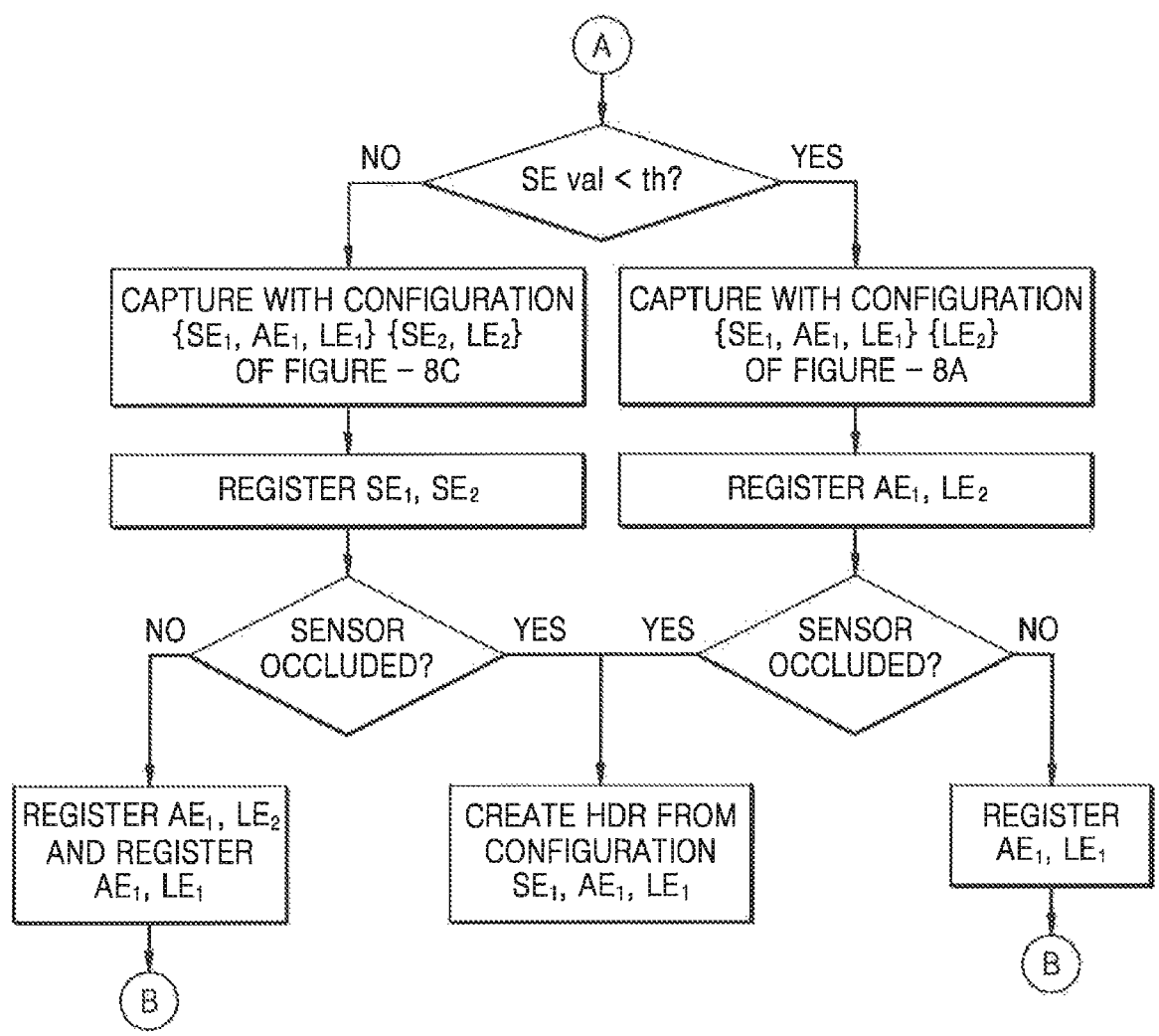
FIGS. 11A, 11B, 11C, and 11D illustrate an algorithm flow used by a processor according to an embodiment of the present disclosure.
Figure 11B:
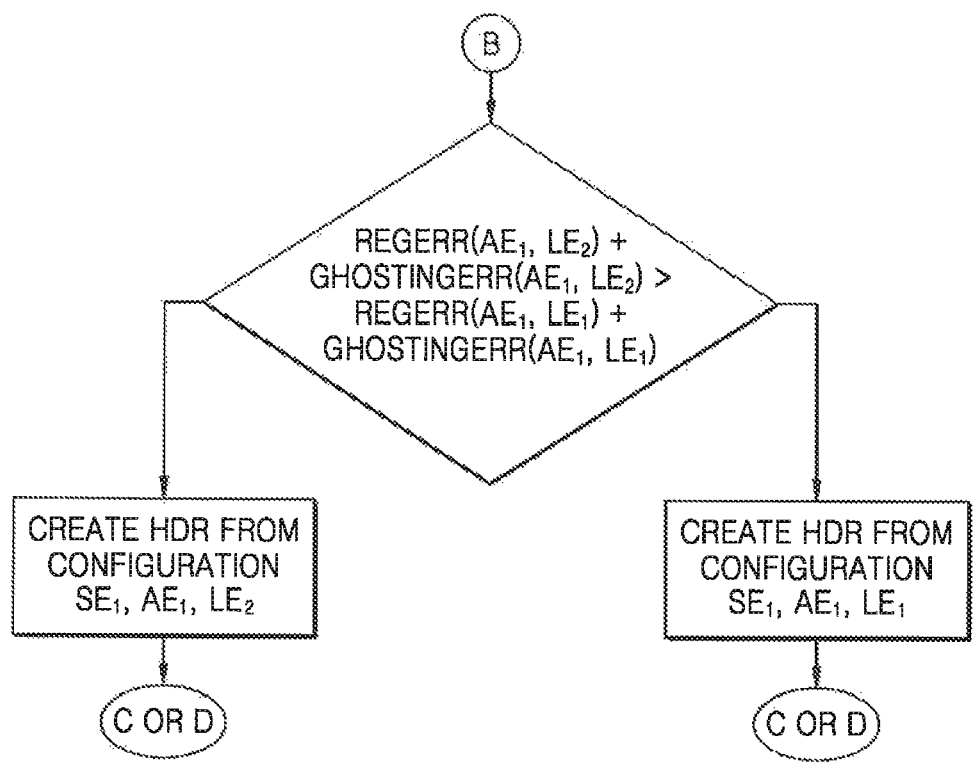

FIGS. 11A and 11B illustrate a sample algorithm flow used by a processor for selecting an appropriate capture configuration in an HDR mode according to an embodiment of the present disclosure.

Referring to FIGS. 11A and 11B, the appropriate capture configuration is selected depending on the exposure time for a SE image. If the exposure time for the SE image is small, the condition is similar to that of high range and bright lighting, and thus, configuration 8C is selected. Otherwise, configuration 8A is selected. Again, if one of the imaging sensors is occluded, then the SE, LE and AE images are selected from the same sensor (SE1, AE1, LE1). Additionally, if significant stereo registration errors exist, then again, all of the 3 input images are picked from the same imaging sensor.

Figure 11C:
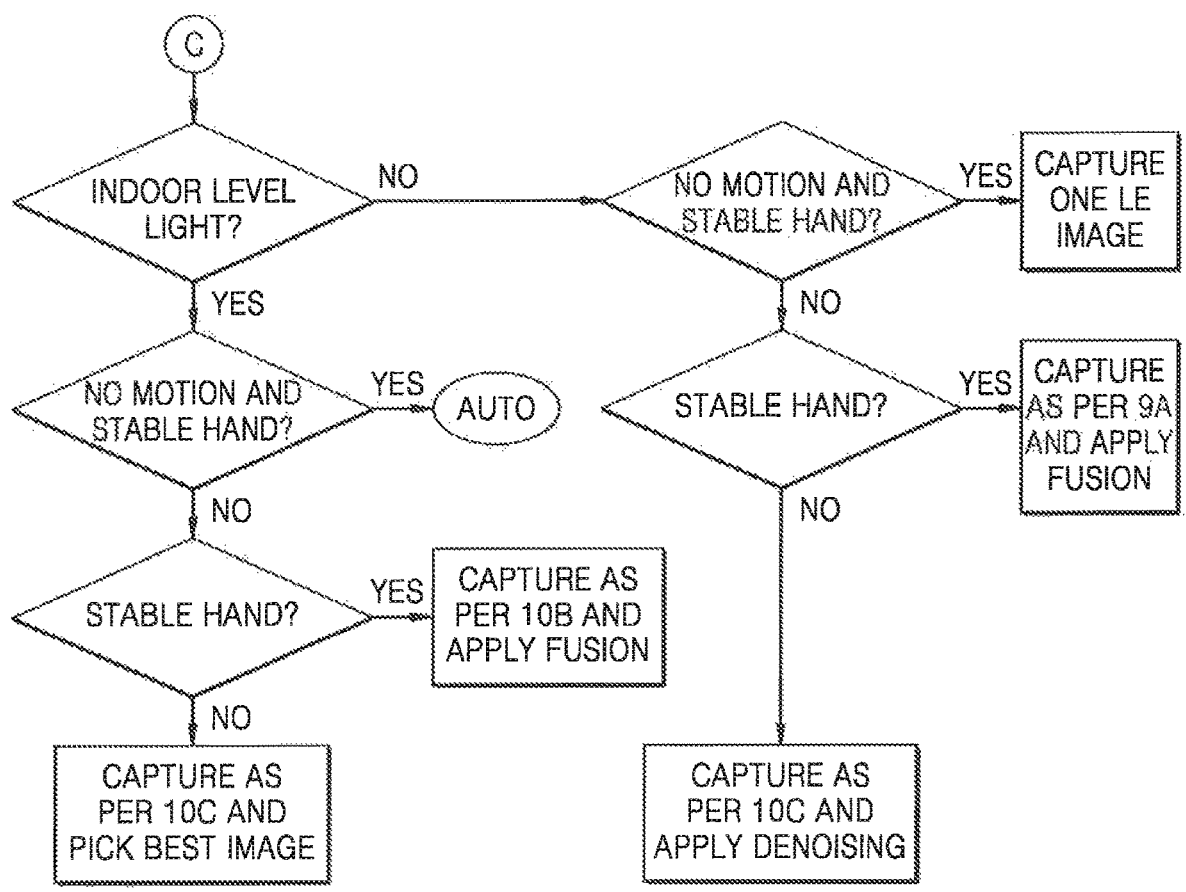
Figure 11D:
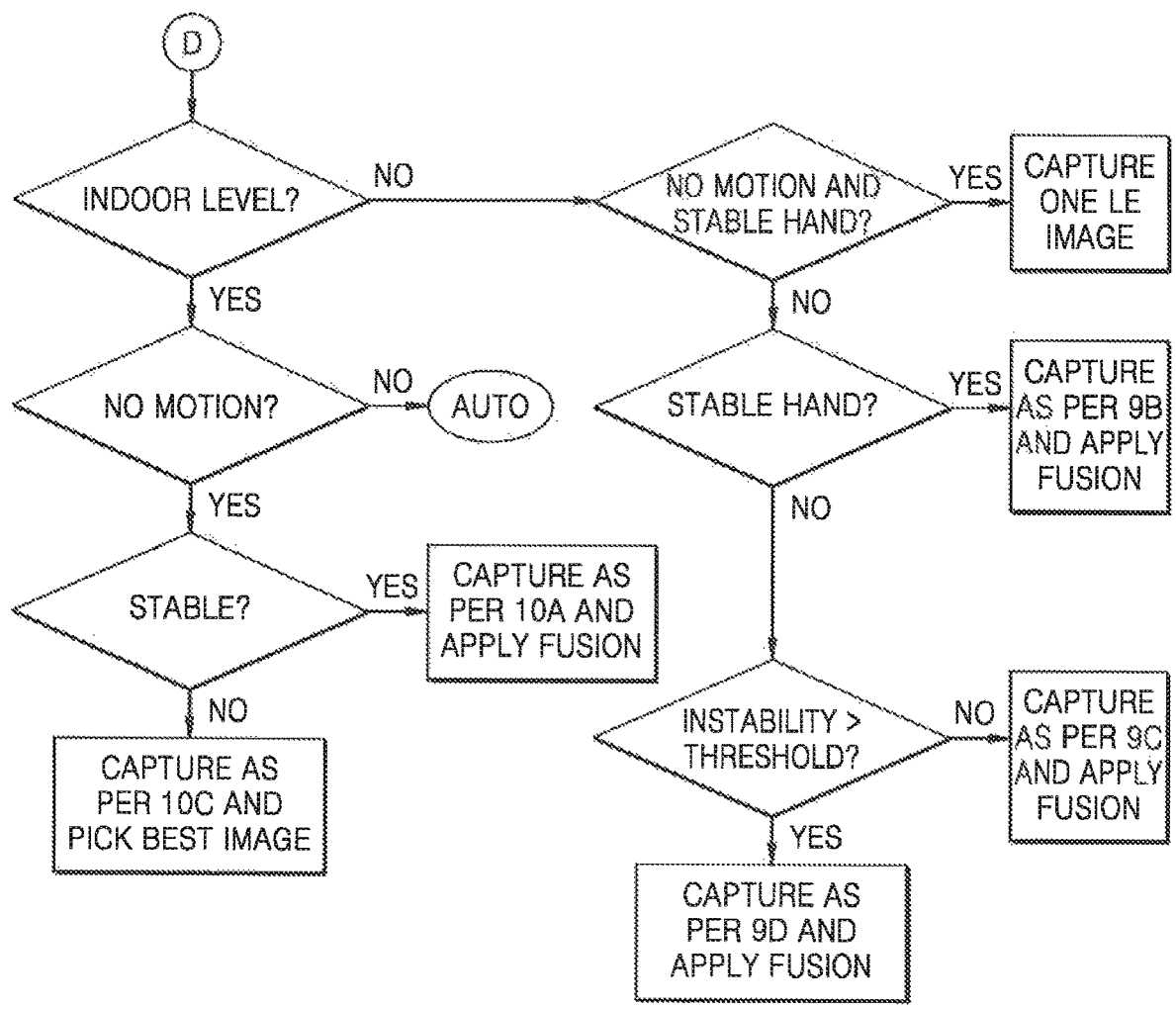

FIGS. 11C and 11D illustrate a sample algorithm flow used by a processor for selecting an appropriate capture configuration in a low light mode according to an embodiment of the present disclosure.

Referring to FIGS. 11C and 11D, in the case of indoor lighting and no object motion or hand motion, an AE image is selected as an output of the processor 204. However, in the case of hand shake or local motion, suitable capture configurations have to be selected. The appropriate configuration is selected based on occlusion/no occlusion (FIGS. 11C/11D), hand shake, and object(s) motion in the field of view, and the like.

Figure 12A:
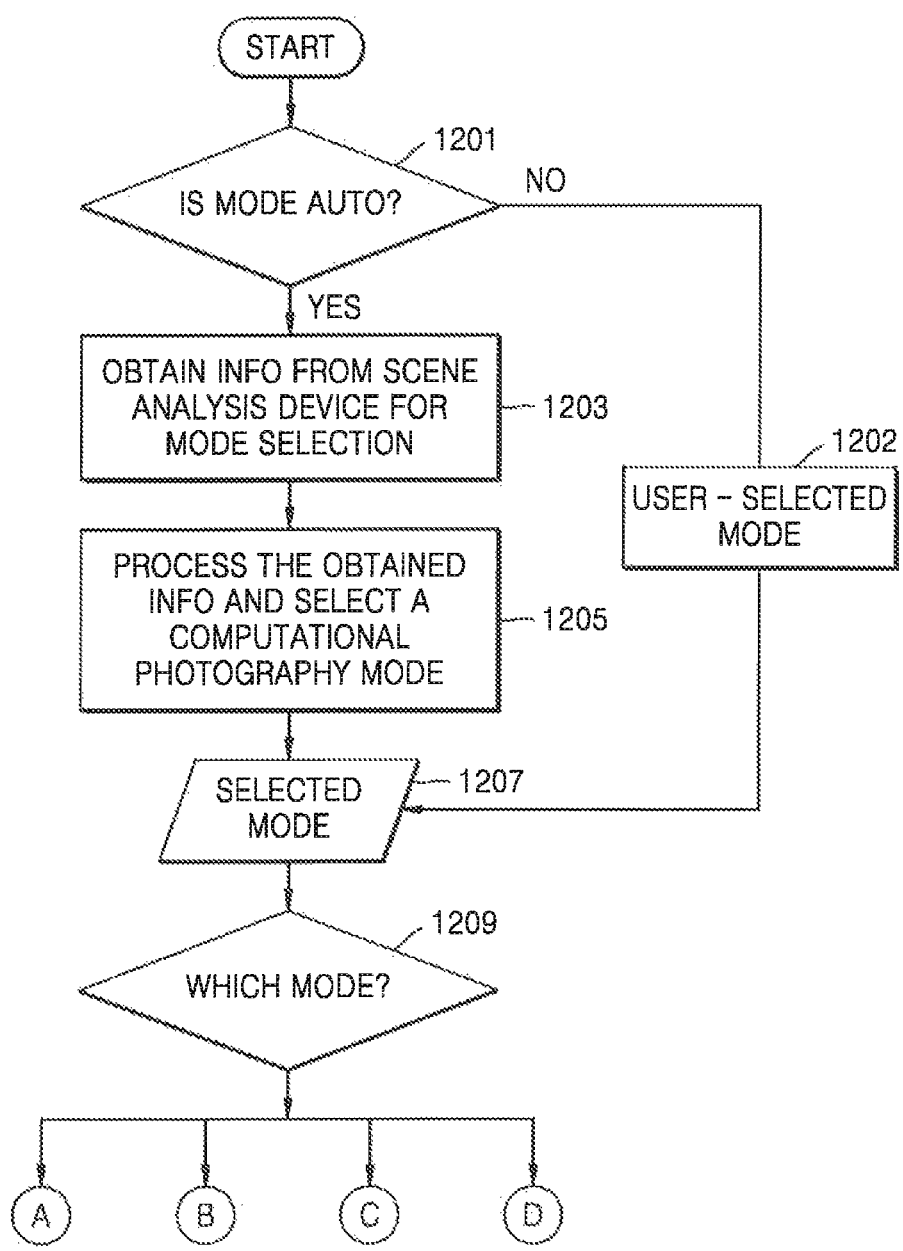
FIGS. 12A, 12B, and 12C illustrate a general flow used by a processor for selecting a mode and capture configuration according to an embodiment of the present disclosure.
Figure 12B:
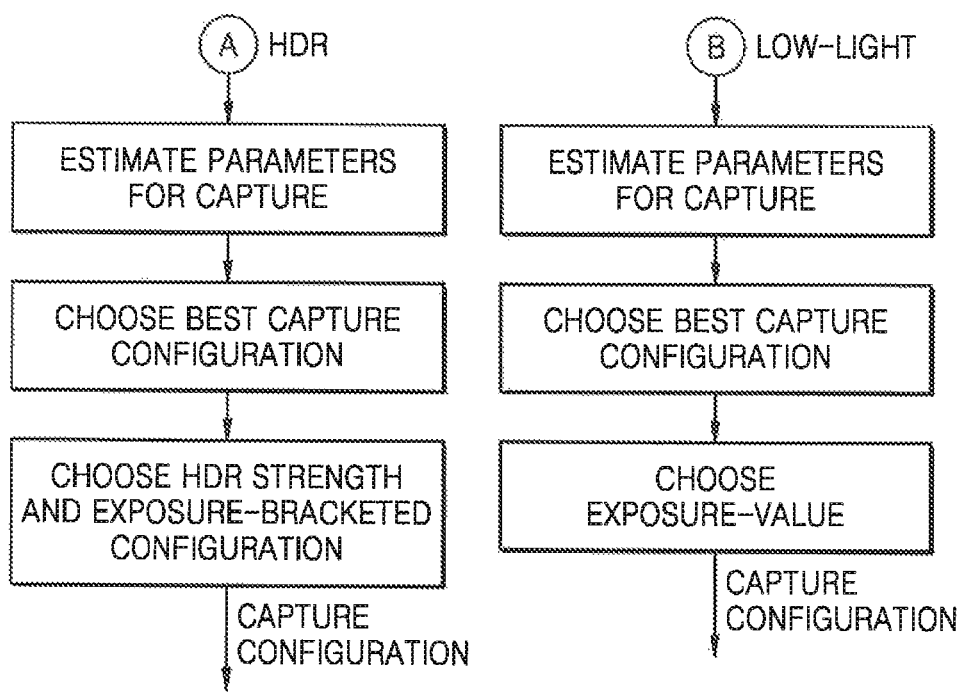
Figure 12C:
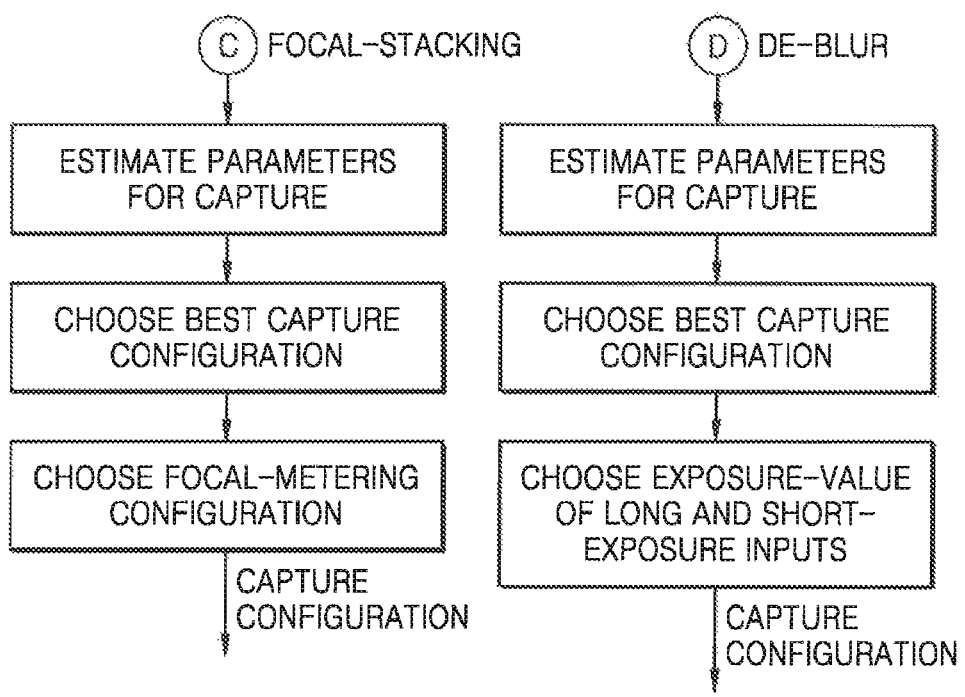

FIGS. 12A, 12B, and 12C illustrate a general flow for selecting a capture mode and a capture configuration according to an embodiment of the present disclosure.

First, the appropriate capture mode is selected. Then, depending on the selected mode, the appropriate capture configuration is selected and the appropriate tuning parameter is identified. In the case of the HDR mode, in addition to selecting the suitable configuration, the EV is set to an appropriate tunable value, controllable by the user in accordance with method shown in FIG. 6C. Similarly, an EV, a focal metering configuration, and an exposure difference between auto and SE images are respectively the tunable parameter for low light, focal stack, and de-blur modes. The EV, the focal metering configuration, and the exposure difference between the auto and SE images along with an algorithm strength may be jointly tuned by the user in accordance with method shown in FIG. 6C.

Referring to FIGS. 12A, 12B, and 12C, in operation 1201, it is determined whether the mode is auto. If it is determined in operation 1201 that the mode is not auto, a user selected mode is identified in operation 1202 and the process proceeds to operation 1207 where the selected mode is processed. Thereafter, in operation 1209, the mode is determined.

On the other hand, if it is determined in operation 1201 that the mode is auto, information is obtained from a scene analysis device for mode selection in operation 1203. In operation 1205, the obtained information is processed and a computational photography mode is selected.

Figure 13A:
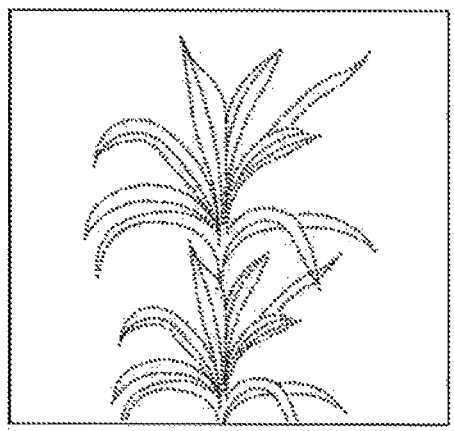
FIGS. 13A, 13B, and 13C illustrate differences in outputs in different scenarios while using different capture configurations according to an embodiment of the present disclosure.
Figure 13A:
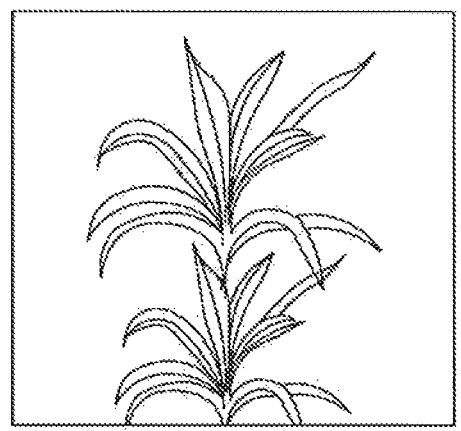
Figure 13B:
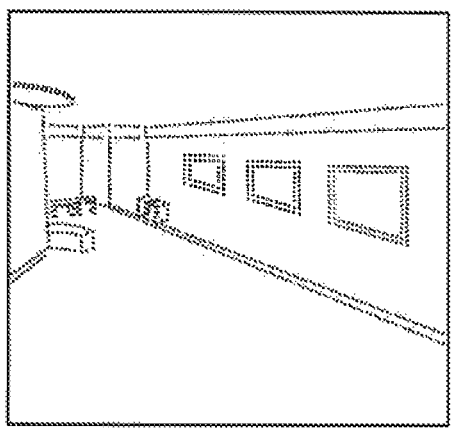
Figure 13B:
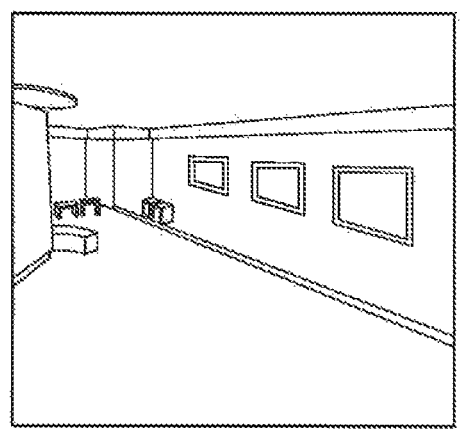
Figure 13C:
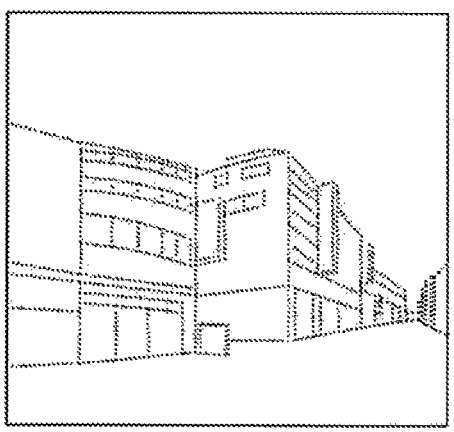
Figure 13C:
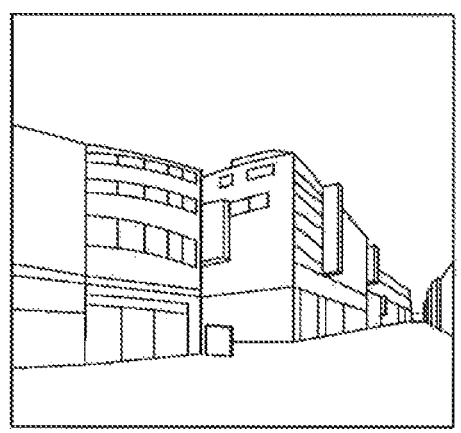

FIGS. 13A, 13B, and 13C illustrate a comparison between selecting a capture configuration that uses images from a same image sensor versus selecting images from different imaging sensors according to an embodiment of the present disclosure. A left image in each of these figures indicates an HDR output upon selecting all 3 images from the same sensor (AE1, SE1, LE1), while a right image indicates an HDR output upon selecting images from different imaging sensors (AE1, SE1, LE2).

Referring to FIG. 13A, the outputs indicate that it is better to select images from different imaging sensors due to a lesser ghosting effect. The overall capture latency is lesser when selecting images from different imaging sensors (AE1, SE1, LE2) and this reduces the ghosting effect.

Referring to FIGS. 13B and 13C, however, due to variations in depth and registration issues, it is better to select images from a single imaging sensor. The processor 204 hence uses these available inputs (depth variations and registration errors) to make decisions regarding the right capture configuration.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of selecting a capture configuration based on scene analysis, the method comprising:
   analyzing, by at least one processor, whether a scene currently being captured by an image capturing device having a plurality of imaging sensors, contains highly moving objects and high depth variations simultaneously;
   identifying a current image capturing mode of the image capturing device based on the analysis of whether the scene contains the highly moving objects and the high depth variations simultaneously;
   setting at least one capture parameter for the plurality of the imaging sensors, upon determining that the at least one capture parameter of the current image capturing mode has to be changed; and
   determining a timing sequence for triggering the plurality of imaging sensors to capture a plurality of image frames based on the set at least one capture parameter.

2. The method of claim 1, further comprising rendering a live preview of the plurality of image frames captured by the plurality of imaging sensors.

3. The method of claim 1, wherein the analyzing of the scene currently being captured comprises:
   inputting, by the image capturing device to the at least one processor, the plurality of image frames, gyroscope readings, and inertial sensor readings, and
   performing at least one of a scene depth analysis with the depth variations and occlusion analysis, local-global motion analysis with the moving objects, and ambient-lighting analysis on the plurality of image frames to identify the current image capturing mode.

4. The method of claim 1, wherein the determining of the timing sequence for triggering the plurality of imaging sensors to capture the plurality of image frames comprises:
   verifying if each of the plurality of imaging sensors is configured for zero shutter lag (ZSL); and
   capturing the plurality of image frames of the scene synchronously across the plurality of imaging sensors, if each of the plurality of imaging sensors is configured for the ZSL.

5. The method of claim 2, wherein the rendering of the live preview of the plurality of image frames comprises:
   performing real-time processing on the plurality of image frames to provide the live preview based on the set at least one capture parameter of the current image capturing mode.

6. The method of claim 1, wherein the at least one capture parameter of the current image capturing mode comprises exposure metering, focal length, and international standards organization (ISO) speed.

7. The method of claim 1, further comprising:
   capturing, by the image capturing device, the scene according to the set at least one capture parameter.

8. The method of claim 7, wherein the current image capturing mode comprises at least one of an auto capture mode, a high definition resolution (HDR) mode, a de-blur mode, an extended depth of field (DOF) mode, and a low light mode.

9. The method of claim 8, wherein the capturing of the scene in the extended depth of field (DOF) mode comprises:
   receiving, by the at least one processor from a depth and occlusion analysis device, depth and occlusion information associated with the scene being captured;
   performing a dynamic differential focal adjustment for each of the plurality of imaging sensors based on the scene analysis for providing a live preview of an extended DOF of the scene; and
   capturing the scene, by the plurality of imaging sensors, after the performing of the dynamic differential focal adjustment.

10. The method of claim 8, wherein the capturing of the scene in the HDR mode comprises:
    performing a differential exposure adjustment in each of the plurality of imaging sensors based on the scene analysis for providing a live preview of an HDR image of the scene; and
    capturing the scene, by the plurality of imaging sensors, after the performing of the differential exposure adjustment.

11. An image capturing device capable of selecting capture configurations based on scene analysis, the image capturing device comprising:
    a plurality of imaging sensors; and
    at least one processor connected to the plurality of imaging sensors, configured to:
      analyze whether a scene currently being captured by the image capturing device, contains highly moving objects and high depth variations simultaneously,
      identify a current image capturing mode of the image capturing device based on the analysis of whether the scene contains the highly moving objects and the high depth variations simultaneously,
      set at least one capture parameter for each of the imaging sensors, upon determining that the at least one capture parameter of the current image capturing mode has to be changed, and
      determine a timing sequence for triggering the plurality of imaging sensors and capture a plurality of image frames based on the set at least one capture parameter.

12. The image capturing device of claim 11, wherein the at least one processor is further configured to render a live preview of the plurality of image frames captured by the plurality of imaging sensors.

13. The image capturing device of claim 11, wherein the image capturing device is further configured to:
    input to the processor, the plurality of image frames, gyroscope readings, and inertial sensor readings, and
    perform at least one of a scene depth with the depth variations and occlusion analysis, local-global motion analysis with the moving objects, and ambient-lighting analysis on the plurality of image frames to identify the current image capturing mode.

14. The image capturing device of claim 11, wherein the determining of the timing sequence by the at least one processor comprises:

verifying if each of the plurality of imaging sensors is configured for zero shutter lag (ZSL); and capturing the plurality of image frames of the scene synchronously across the plurality of imaging sensors, if each of the plurality of imaging sensors is configured for the ZSL.

15. The image capturing device of claim 12, wherein the rendering of the live preview of the plurality of image frames captured by the plurality of imaging sensors comprises:

performing real-time processing on the plurality of image frames to provide the live preview based on the set at least one capture parameter of the current image capturing mode.

16. The image capturing device of claim 11, wherein the image capturing device is further configured to capture the scene according to the set at least one capture parameter.

17. The image capturing device of claim 16, wherein the current image capturing mode comprises at least one of an auto capture mode, a high definition resolution (HDR) mode, a de-blur mode, an extended depth of field (DOF) mode, and a low light mode.

18. The image capturing device of claim 17, wherein the capturing of the scene in the extended depth of field (DOF) mode comprises:

receiving from a depth and occlusion analysis device, depth and occlusion information associated with the scene being captured;

performing a dynamic differential focal adjustment for each of the plurality of imaging sensors based on the scene analysis for providing a live preview of an extended depth of field of the scene; and capturing the scene after the performing of the dynamic differential focal adjustment.

19. The image capturing device of claim 17, wherein the capturing of the scene in the HDR mode comprises:

performing a differential exposure adjustment in each of the plurality of imaging sensors based on the scene analysis for providing a live preview of an HDR image of the scene; and capturing the scene after the performing of the dynamic differential exposure adjustment.

20. A non-transitory computer readable recording medium having recorded thereon a program for executing a method of selecting a capture configuration based on scene analysis, the method comprising:

analyzing whether a scene currently being captured by an image capturing device having a plurality of imaging sensors, contains highly moving objects and high depth variations simultaneously;

identifying a current image capturing mode of the image capturing device based on the analysis of whether the scene contains the highly moving objects and the high depth variations simultaneously;

setting at least one capture parameter for each of the imaging sensors, upon determining that the at least one capture parameter of the current image capturing mode has to be changed; and determining a timing sequence for triggering the plurality of imaging sensors to capture a plurality of image frames based on the set at least one capture parameter.

21. The non-transitory computer readable recording medium of claim 20, wherein the timing sequence for triggering the plurality of imaging sensors to capture the plurality of image frames based on the set at least one capture parameter comprises:

taking at least one long exposure image with a first lens, and taking a plurality of short exposure images with a second lens.

22. The non-transitory computer readable recording medium of claim 20, wherein the timing sequence for triggering the plurality of imaging sensors to capture the plurality of image frames based on the set at least one capture parameter comprises:

taking at least one long exposure image with a first lens, taking at least one short exposure image with the first lens, and taking a plurality of short exposure images with a second lens.

* * * * *